US006876908B2

(12) United States Patent
Crämer et al.

(10) Patent No.: US 6,876,908 B2
(45) Date of Patent: Apr. 5, 2005

(54) METHOD FOR CREATING A MAINTENANCE ALGORITHM

(75) Inventors: Regine Crämer, Stuttgart (DE); Ursula Felger, Schorndorf (DE); Rainer Kaufmann, Stuttgart (DE); Andrej Krauth, Denkendorf (DE); Jürgen Trost, Grafenberg (DE)

(73) Assignee: DaimlerChrysler AG, Stuttgart (DE)

( * ) Notice: Subject to any disclaimer, the term of this patent is extended or adjusted under 35 U.S.C. 154(b) by 31 days.

(21) Appl. No.: 10/259,812

(22) Filed: Sep. 30, 2002

(65) Prior Publication Data

US 2003/0065771 A1 Apr. 3, 2003

(30) Foreign Application Priority Data

Sep. 28, 2001 (DE) .......................................... 101 48 214

(51) Int. Cl.[7] ........................ G01M 19/00; G06F 17/40; G06F 3/00
(52) U.S. Cl. ............................ 701/30; 701/29; 702/182
(58) Field of Search .............................. 701/29, 30, 32, 701/35, 99; 702/182, 183, 179, 185; 73/117.3, 118.1, 117.2

(56) References Cited

U.S. PATENT DOCUMENTS

| 5,018,069 A | * | 5/1991 | Pettigrew ..................... 701/35 |
| 5,777,211 A | * | 7/1998 | Binienda et al. ............ 73/53.05 |
| 5,781,871 A | * | 7/1998 | Mezger et al. ............... 455/424 |
| 5,844,473 A | | 12/1998 | Kaman |
| 6,253,601 B1 | * | 7/2001 | Wang et al. ................ 73/117.3 |
| 6,370,454 B1 | * | 4/2002 | Moore .......................... 701/29 |
| 6,408,258 B1 | * | 6/2002 | Richer ........................ 702/182 |
| 6,480,810 B1 | * | 11/2002 | Cardella et al. ............ 702/188 |

FOREIGN PATENT DOCUMENTS

| DE | 3110774 A1 | 10/1982 |
| DE | 4446512 A1 | 6/1996 |
| DE | 19853000 A1 | 6/1999 |
| FR | 2542478 | 9/1984 |
| WO | WO 90/09645 A1 | 8/1990 |
| WO | WO 96/27171 A1 | 9/1996 |

* cited by examiner

Primary Examiner—Tan Q. Nguyen
Assistant Examiner—Dalena Tran
(74) Attorney, Agent, or Firm—Venable LLP; Robert Kinberg; Daniel G. Vivarelli, Jr.

(57) ABSTRACT

A method for creating a maintenance algorithm for a fleet of vehicles, with which maintenance information can be collected and displayed in each vehicle of the fleet. In the fleet vehicles, sensor data that are indicative of a stress on components in the vehicles are used to derive stress variables. The ascertained stress variables are stored in the vehicles for a predetermined period and, if a wear-related event occurs, wear variables that characterize a wear-related event are additionally ascertained. The stress variables and the wear variables are transmitted to a central location or station, in which the previous maintenance algorithm is checked with the use of the stress and wear variables, and, if applicable, an improved maintenance algorithm can be derived. The maintenance algorithm serves in establishing and indicating a time when the vehicle should be serviced.

10 Claims, 1 Drawing Sheet

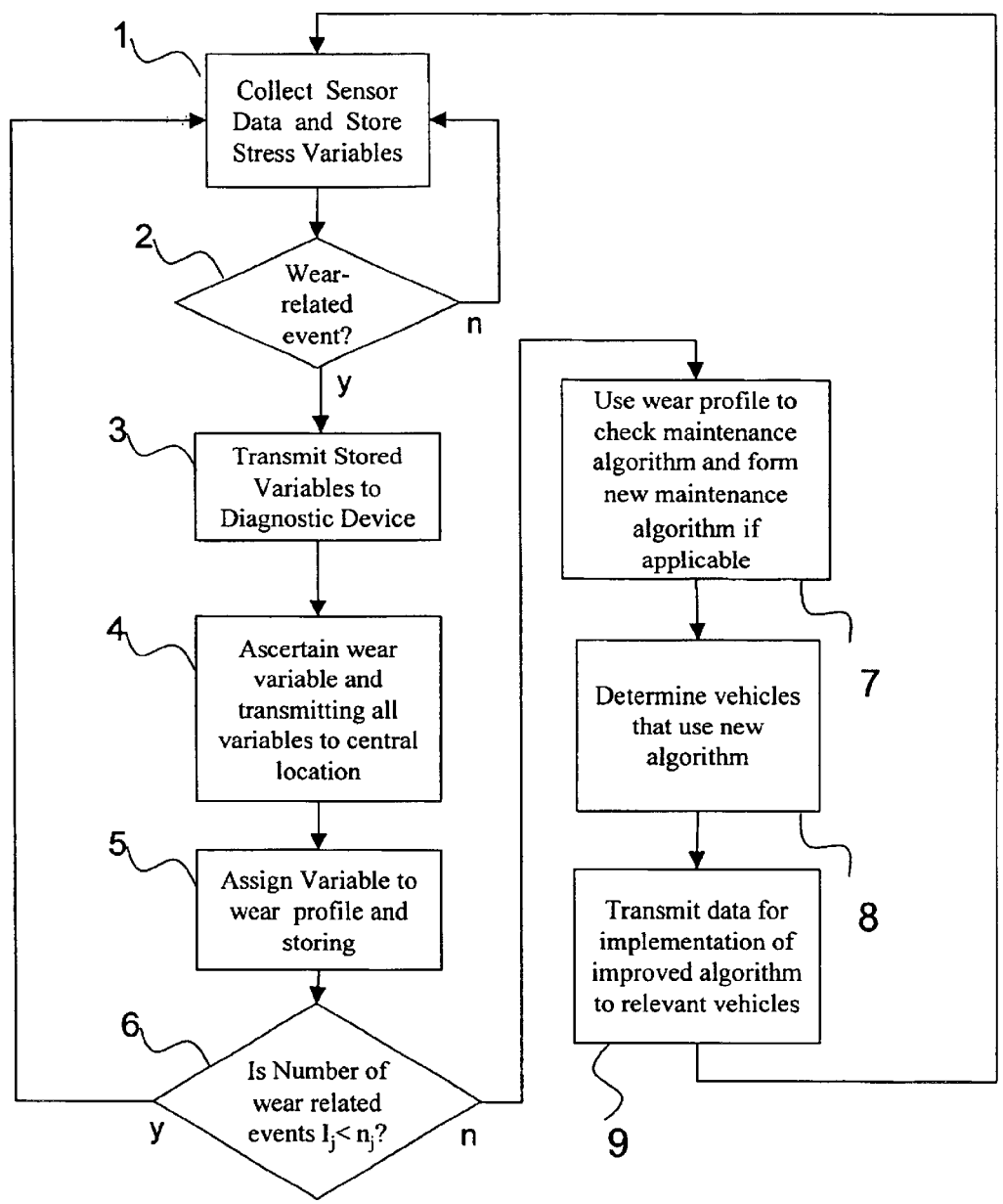

METHOD FOR CREATING A MAINTENANCE ALGORITHM

CROSS-REFERENCE TO RELATED APPLICATION

This application is based on and claims the priority date of German Application No. 101 48 214.0, filed on Sep. 28, 2001, which is incorporated herein by reference.

BACKGROUND OF THE INVENTION

The invention relates to a method for creating a maintenance or service algorithm for a fleet of vehicles, which can be used to ascertain and display maintenance information in each vehicle of the fleet.

DE 3110774 A1 discloses a maintenance algorithm for determining maintenance and servicing intervals; this algorithm allows maintenance and service work to be performed as a function of wear levels. For this purpose, operating variables or values are ascertained and compared to predetermined threshold values. If an operating variable or value has exceeded a predetermined threshold value, the driver is notified that maintenance work is necessary.

DE 4446512 A1 discloses an apparatus for performing a vehicle test and evaluating vehicle malfunctions. The apparatus transmits breakdown and malfunction messages via a mobile radio telephone to a central station or location, which in turn transmits control information and warning messages to the vehicle for remedying the malfunction or prompting the driver to find a repair shop.

Furthermore, DE 19853000 A1 discloses a method for supplying motor vehicles with data that serve in monitoring the function of vehicles. The data, e.g., operating and diagnosis data, are transmitted wireless to a central station or location, which then transmits parameters, programs or program excerpts to the vehicle. The data transmitted to the vehicle are used in the vehicle for diagnostic purposes, such as for the brake system, or for information about brake liner thicknesses. This document, however, does not give any indication of how to optimize a maintenance or diagnostic algorithm.

SUMMARY OF THE INVENTION

It is the object of the invention to provide a method for creating a maintenance algorithm for a vehicle fleet, the method allowing the maintenance algorithm to be optimized.

The above object generally is achieved according to the present invention by a method for creating a maintenance or service algorithm for a fleet of vehicles, with the algorithm being used to ascertain maintenance or service information in each vehicle of the fleet, and with the method comprising: collecting sensor data that are indicative of a stress on components in the vehicles; using the collected sensor data to derive stress variables in the vehicles of the fleet; storing the stress variables in the vehicles for a predetermined time frame and, if a wear-related event occurs, additionally ascertaining wear variables; transmitting the stress variables and the wear variables to a central station; and in the central station or location, checking a previous maintenance algorithm with the use of the stress and wear variables, and, if applicable, deriving an improved maintenance algorithm.

In the method according to the invention for creating a maintenance or service algorithm for a fleet of vehicles, each vehicle of the fleet detects sensor data that are indicative of stress or abrasion of vehicle components, such as electrical, electronic or mechanical aggregates in the vehicle. The vehicle fleet typically comprises numerous vehicles that have already been delivered to customers.

Stress values or variables are derived from the collected sensor data. To this end, several quantities of sensor data can be linked to form collectives or stress variables. For example, the vehicle speed can be determined as a stress value or variable from the wheel rpms complied for all four wheels. Other examples of stress variables include the number of ABS braking processes, the number of startups or the cooling operation of the climate-control system, the fuel consumption, the external temperature, the quality of the exhaust gas, or the quantity or temperature of the exhaust gas. In particular, a plurality of individual data (sensor data or stress variables) can be combined to form a data set (e.g., in the form of a quantity of data or a multidimensional data field), which can in turn represent a stress variable.

A stress variable can relate to a specific vehicle component, in which case the stress variable offers definitive information about how much stress the vehicle component has experienced. An example of a stress variable that is specific to the stress on the starter is the number of startups. Another starter-related stress variable can include the external temperature and the engine temperature during startup, or the duration of the startup. A further stress variable, which can be used for determining the service life of the battery, can additionally include, for example, the battery-charge status during a startup. Simple stress variables include the length of operation of a vehicle component and the mileage of the vehicle.

In accordance with the invention, a memory device in the vehicle stores the stress variables for a predeterminable period, particularly since the initial startup of a vehicle, since the first startup of a vehicle component, since the last maintenance on the vehicle or since the last data transmission. These data can be employed in estimating the total stress of a vehicle component. At preset times, particularly at the time of a wear-related event, the stored stress variables are transmitted to a central station; in addition to the stress variables, wear variables are also preferably transmitted to the central station. The comparison values characterize the wear-related event. Examples of wear-related events include the breakdown of a component, such as a generator or a headlight element, or the electronic detection of abrasion of a brake lining up to a threshold determined by the detection device. Examples of the corresponding wear variables include the vehicle components affected by the wear-related event, such as a generator, brake lining, etc., the time and date of the wear-related event and the nature of the event.

As an alternative to transmitting the stress and wear variables to the central station or location when a wear-related event occurs, the stress variables are transmitted to the central location at preset intervals, such as each time maintenance work is performed on the vehicle.

The data can be transmitted to the central location directly, e.g., telematically, or indirectly via a diagnostic device in a repair shop or via a different data-acquisition and transmission system.

In the central location, the transmitted data, especially the stress and wear variables and the vehicle-type data, are collected, stored and used to check the maintenance algorithm that was previously used, and possibly to create a new, improved maintenance algorithm. In the central location, manufacturer data or data stemming from the research, development or production department may be utilized in addition to the wear and stress variables for creating the new maintenance algorithm.

The advantage of the method according to the invention is that the ascertaining of maintenance information, and especially the issue of a preventive warning to the driver about the foreseeable time remaining before a component breaks down or wears, take into account empirical knowledge that can be made available from data collected for numerous other vehicles. The disclosed method permits a comprehensive, fast incorporation of the data from other vehicles. The maintenance algorithm can be routinely improved and updated on the basis of the experience of the fleet. Further advantages include a reduction of the data that are stored in the vehicle (onboard), transmitted to the central station (location) and evaluated there. This data reduction is effected by the inclusion of stress variables that replace the comprehensive sensor data, on the one hand, and by the transmission of the data precisely when a wear-related event occurs, on the other hand. This eliminates the need to collect and evaluate all of the data from the fleet vehicles on an ongoing basis in the central location.

In a modification of the method, the data relating to an improved algorithm, an improved portion of the maintenance algorithm or altered parameters of the maintenance algorithm are transmitted to the vehicles of a fleet, and the improved maintenance algorithm is implemented in the affected vehicles with the use of the transmitted data. The advantage of this modification is that the improved maintenance algorithm is not only implemented in new, as-yet undelivered vehicles, but also in all vehicles already in use.

The data exchange between the vehicle and the central location can be incorporated into a shop appointment, or be effected at an established location of the vehicle, but is preferably effected wireless and during normal driving operation of a vehicle.

In an advantageous embodiment of the invention, the wear and stress variables of vehicles of the same type, especially vehicles of a comparable configuration, are evaluated for improving the maintenance algorithm. This is advantageous because knowledge gained from data relating to vehicles of a single type can easily be transmitted to a vehicle of the same type and/or to vehicles of the same or similar configuration. In vehicles of the same vehicle type, identical stress variables result in comparable wear, and the service life and causes for breakdowns of components can be transferred to vehicles of similar configuration.

In an embodiment of the method, a wear profile is assigned to the stress and wear variables in the central location. The data of a wear profile are evaluated precisely when a predeterminable, significant number of wear-related events of a wear profile (incidences of wear with comparable or similar marginal conditions) is present, which can be checked with a threshold-value function, for example. If an evaluation of the wear-related events of a wear profile yields the assessment that the maintenance algorithm can be improved, the data for implementing the improved maintenance algorithm are transmitted to the vehicles of the relevant vehicle type having the relevant configuration. A plurality of configurations of a vehicle type, or a plurality of vehicle types of a particular vehicle configuration, may be affected by the new maintenance algorithm.

The frequency of wear-related events and a correlation of ascertained parameters, particularly from correlating stress variables, can be used in the central location to determine systematic connections between stress variables and the service life of components, which are then used to improve the maintenance algorithm, for example, through the incorporation of stress variables that have not yet been taken into account. Moreover, a manufacturer can be informed of the weak points of a component or structural part. Forwarding information about causes of wear to vehicle manufacturers or suppliers gives them the opportunity to improve the product quality in view of the actual stresses to which a vehicle component is subjected in practical use.

In a modification of the method, when a wear-related event occurs, a repair shop, a replacement-part supplier or distributor of replacement parts is telematically informed of the wear profile, in addition to the central location. The information may be transmitted directly from the vehicle or via the central location. This allows preparations to be made for a repair, such as the ordering of a needed replacement part or the shipping of a replacement part to the relevant location. In a repair shop, the required capacity for performing the repair work can be planned. This can further decrease the waiting time for the vehicles.

A vehicle that has been prepared for the execution of the method has an onboard electronic system with an implemented maintenance algorithm, which uses the stress variables to ascertain maintenance information, such as a servicing time for a vehicle component. The maintenance information, which can be displayed optically or acoustically, can be transmitted to the vehicle driver, a registered keeper or a fleet administrator. The onboard electronic system also permits the transmission of data to a device remote from the vehicle, such as to a diagnostic device in a repair shop, or a telematic transmission to a central location.

The onboard electronics system can determine an optimum maintenance time for a vehicle component, or for the entire vehicle, by checking whether an operating variable or a stress variable in the vehicle has exceeded a predeterminable threshold, or a predeterminable amount of abrasion has occurred. The system checks whether the established maintenance time falls within a predeterminable time frame or within a predeterminable mileage range, and if so, the maintenance information is displayed for the driver.

Once an optimum maintenance time has been determined for a component, an acoustic or visual message indicates that the generator must be serviced within three months, for example, or that the brake linings will function properly for another 5000 Km. It is then the driver's or keeper's decision to put off the service appointment, and risk a breakdown of the respective component, or go to the repair shop at the recommended time, or immediately.

If the optimum maintenance time is not determined for a component, but for the entire vehicle, the maintenance algorithm may incorporate the ascertained wear levels and/or the remaining service life of several or all of the components. The driver is informed, for example, by a display that indicates that he should have the vehicle serviced at a shop within the next 3000 Km.

In a modification of the method, the stress variables are also transmitted to the central location within the framework of the (preventive) maintenance of the vehicle. Because the (preventive) maintenance has been performed before the occurrence of a wear-related event, no wear variables are detected in the vehicle. Again, the vehicle or the repair shop can transmit the data. In addition to the stress variables, the repair shop can also transmit data relating to the state of the relevant component to the central location, which employs them in creating an improved maintenance algorithm.

An advantageous embodiment of the method according to the invention is described below in conjunction with the drawing.

BRIEF DESCRIPTION OF THE DRAWINGS

The single drawing FIGURE shows a flow diagram of an advantageous method for creating a service or maintenance or service algorithm according to the invention.

DESCRIPTION OF THE PREFERRED EMBODIMENTS

In vehicles that have been prepared for the execution of the method (fleet vehicles), in Step 1 sensor data are continuously detected in the vehicle. Stress variables are derived from the sensor data and stored in a memory. In Step 2, if a wear-related event occurs in a vehicle, that is, a component breaks down or it is detected electronically that a predetermined wear limit has been reached in a component, the procedure branches to Step 3. If this is not the case, the stress variables continue to be stored in Step 1.

Following a wear-related event, the stored stress variables are transmitted to a diagnostic device in a repair shop in Step 3. This is effected, for example, within the framework of a repair or servicing necessitated by the wear-related event. In Step 4, the wear variables are additionally ascertained in the repair shop and transmitted, with the stress variables, to a central location. In addition to the wear and stress variables, configuration and/or type data for the vehicle can be transmitted to the central location.

Alternatively or additionally to Steps 3 and 4, a data-processing device acquires the wear variables and stores them in a memory, like the stress variables. In the repair shop, the wear and stress variables are transmitted to a diagnostic device, and/or telematically from the vehicle to a central location. If the variables are transmitted telematically to the central location, it is not necessary for the vehicle to be in a repair shop in order to execute the method.

In the central location, in Step 5 the stress and wear variables, with the configuration and type data for the vehicle, are assigned a wear profile j and stored.

As an option, in Step 5 the central location can send information to a further location, such as to a supplier, a development or production department, a customer service department or a replacement-parts storage location.

In Step 6, the device checks whether the number of wear-related events $I_j$ of a wear profile j exceeds a predeterminable number $n_j$. Here, the threshold value $n_j$ is a function that is dependent on the relevant vehicle type, the produced vehicles of the relevant vehicle type, the time since the start of production and possible further parameters. If the number of ascertained wear-related events $I_j$ lies below the threshold value $n_j$, the number of wear-related events is considered insignificant, and the procedure returns to Step 1. A wear profile called "other breakdowns" can also be provided for the purpose of ascertaining and assessing wear-related events that occur with an unpredicted frequency.

If the result of the inquiry in Step 6 is that the number of wear-related events $I_j$ of a wear profile j exceeds a predeterminable number $n_j$, the procedure continues to Step 7. In Step 7, the data for a wear profile j that are stored in the central location are used to check the maintenance algorithm that was previously implemented in the vehicles, and possibly to create a new maintenance algorithm and transmit it to the relevant vehicles (to the vehicle fleet). In the new, improved maintenance algorithm, a threshold value for the service life of a component, such as a generator, an air filter or a brake lining, is altered, or the weighting of the ascertained stress variables is altered. The new maintenance algorithm is created, for example, through the reduction of a threshold value for the service life or performance of a vehicle component in comparison to the old maintenance algorithm. The new maintenance algorithm is preferably created and implemented fully automatically by a data-processing unit in the central location.

In Step 8 the central location determines all of the vehicles in which a new, improved maintenance algorithm should be implemented. This can be effected by way of a database of an online inquiry of vehicle data. The relevant vehicles are, for example, all vehicles of the same type or all vehicles of the same configuration, because these vehicles have similar wear variables, and/or identical components are built into these vehicles. In the selection of the relevant vehicles, the model year of the vehicles or the manufacturing company of a component, for example, can be used as distinguishing factors for ascertaining which vehicles have the relevant components that exhibit a significant deviation of the component service life or the maintenance requirements in comparison to the values forming the basis of the previous maintenance algorithm.

In Step 9, the data required for implementing the new maintenance algorithm in the vehicle are transmitted into the relevant vehicles via a telematic interface. For example, new limit values can be transmitted. The transmitted data are used to implement the new maintenance algorithm in the relevant vehicles.

As an alternative, the transmission of the data required for implementing the new, improved maintenance algorithm can also be effected in a repair shop, for example the next time that a vehicle is in the shop. It is also possible for the registered keeper or the driver to perform the data transfer using, for example, a mobile telephone or a data carrier.

Knowledge gained from the wear-related occurrences can be utilized very quickly to extend the length of maintenance intervals and prevent accidents. All of the vehicles employing the method have an up-to-date version of the maintenance algorithm.

The method is then continued in Step 1. Afterward, the data stored in the central location, particularly the stress and wear variables, are evaluated. The counter ij is set at zero or a new threshold value nj is preset.

The method can be fully automated if it is determined in advance how the maintenance algorithm must be adapted. In the simplest case, limit values are adapted. Beginning with start limit values that are not set too low, with each complete execution of the method, the limit value is optimized until the threshold value $n_j$ is no longer exceeded. This prevents accidents.

If, as an expansion of the previous observation, a visit to a repair shop that was prompted by maintenance information sent to the driver is also considered a wear-related event, the method can also be used to correct a limit value for the service life of a vehicle component that was set too low. Thus, it is possible to lengthen the maintenance interval to be observed.

The method is also suitable for creating maintenance algorithms or limit values for vehicle components for which no maintenance algorithms or limit values for the maintenance algorithms are present when the vehicle is introduced onto the market, is and suitable for providing the algorithm or values to the vehicle fleet. Such vehicle components can be a generator, starter or catalytic converter.

The invention now being fully described, it will be apparent to one of ordinary skill in the art that many changes and modifications can be made thereto without departing from the spirit or scope of the invention as set forth herein.

What is claimed is:

1. A method for creating a maintenance algorithm for a fleet of vehicles, the algorithm being used to ascertain maintenance information in each vehicle of the fleet, said method comprising:

collecting sensor data that are indicative of a stress on components in the vehicles and using the collected sensor data to derive stress variables in the vehicles of the fleet;

storing the stress variables in the vehicles for a predetermined time frame and, if a wear-related event occurs, additionally ascertaining wear variables;

transmitting the stress variables and the wear variables to a central location; and in the central location, checking a previous maintenance algorithm with the use of the stress and wear variables, and, if applicable, deriving an improved maintenance algorithm.

2. The method according to claim 1, further comprising transmitting data for implementing the improved maintenance algorithm from the control location to vehicles of the fleet, and thereafter implementation the improved maintenance algorithm is in the vehicles on the basis of the transmitted data.

3. The method according to claim 2, including transmitting the data for implementing the improved maintenance algorithm in a wireless manner from the control location to the vehicles of the fleet.

4. The method according to claim 1, including, upon the occurrence of a wear-related event in a vehicle, transmitting the stress variables and the wear variables in a wireless manner from the vehicle to the central location.

5. The method according to claim 1, including upon the occurrence of a wear-related event in a vehicle, reading out the stored stress variables and the wear variables during a service appointment in a repair shop, and transmitting the read out variables to the central location.

6. The method according to one of claims 1, wherein the method is automated.

7. The method according to claim 6, including automatically ascertaining limit values of a maintenance algorithm in the central location using a data-processing device, and transmitting these limit values to the relevant vehicles of the fleet.

8. The method according to claim 1, including evaluating the wear variables and stress variables of vehicles of a comparable configuration for improving the maintenance algorithm.

9. The method according to claim 1, including in the central location, assigning a wear profile to a predeterminable combination of at least one stress variable and at least one wear variable;

predetermining a threshold value for the number of incidences of a wear profile; and improving the maintenance algorithm if the number of wear-related events that have actually occurred and been ascertained exceeds the threshold value for the respective wear profile.

10. The method according to claim 9, wherein the threshold value for the number of incidences of a wear profile is a function that depends on the number of vehicles of a relevant vehicle type utilizing the method.

* * * * *